US008816225B2

(12) United States Patent
Deleo et al.

(10) Patent No.: US 8,816,225 B2
(45) Date of Patent: Aug. 26, 2014

(54) STATIC PRESSURE ANTI-STOW LOGIC FOR PLATFORM WHEELCHAIR LIFTS

(75) Inventors: Dante V. Deleo, Santa Clarita, CA (US); Steven Fisher, Rosamond, CA (US)

(73) Assignee: Ricon Corp., Panorama City, CA (US)

( * ) Notice: Subject to any disclaimer, the term of this patent is extended or adjusted under 35 U.S.C. 154(b) by 652 days.

(21) Appl. No.: 12/936,567

(22) PCT Filed: Apr. 29, 2009

(86) PCT No.: PCT/US2009/042027
§ 371 (c)(1),
(2), (4) Date: Oct. 6, 2010

(87) PCT Pub. No.: WO2009/134837
PCT Pub. Date: Nov. 5, 2009

(65) Prior Publication Data

US 2011/0031040 A1 Feb. 10, 2011

Related U.S. Application Data

(60) Provisional application No. 61/049,667, filed on May 1, 2008.

(51) Int. Cl.
*G01G 19/10* (2006.01)
*G01G 5/04* (2006.01)

(52) U.S. Cl.
USPC ............. 177/141; 177/146; 177/147; 414/21; 414/546; 414/921; 73/1.13

(58) Field of Classification Search
USPC ................. 177/141, 146, 147, 208, 209, 254; 73/1.13, 1.15; 414/21, 546, 917, 921
See application file for complete search history.

(56) References Cited

U.S. PATENT DOCUMENTS

| | | | | |
|---|---|---|---|---|
| 3,581,836 | A * | 6/1971 | Segerdahl et al. | 177/1 |
| 4,403,680 | A * | 9/1983 | Hillesheimer | 177/146 |
| 4,534,450 | A | 8/1985 | Savaria | |
| 5,038,215 | A | 8/1991 | Hadfield | |
| 5,065,828 | A * | 11/1991 | Smith | 177/139 |
| 5,261,779 | A | 11/1993 | Goodrich | |
| 5,445,488 | A | 8/1995 | Saucier et al. | |
| 5,605,431 | A | 2/1997 | Saucier et al. | |
| 5,666,295 | A * | 9/1997 | Bruns | 702/174 |
| 5,944,473 | A | 8/1999 | Saucier et al. | |
| 5,994,650 | A * | 11/1999 | Eriksson et al. | 177/45 |
| 6,461,097 | B1 | 10/2002 | Ablabutyan et al. | |
| 6,467,264 | B1 | 10/2002 | Stephenson et al. | |
| 6,756,547 | B2 * | 6/2004 | Lefler | 177/141 |
| 7,632,058 | B2 * | 12/2009 | Ablabutyan et al. | 414/809 |
| 2005/0238471 | A1 | 10/2005 | Ablabutyan et al. | |
| 2006/0233632 | A1 * | 10/2006 | Hayes et al. | 414/546 |
| 2007/0224025 | A1 | 9/2007 | Ablabutyan et al. | |

* cited by examiner

*Primary Examiner* — Randy W Gibson
(74) *Attorney, Agent, or Firm* — The Webb Law Firm

(57) ABSTRACT

A method for detecting weight on a platform lift having a platform, a hydraulic cylinder, and a hydraulic circuit including the steps of measuring a static pressure of the hydraulic circuit, and comparing the measured static pressure to a baseline pressure of the hydraulic circuit. The baseline pressure is a static pressure of the hydraulic circuit without external weight positioned on the platform.

16 Claims, 3 Drawing Sheets

STATIC PRESSURE ANTI-STOW LOGIC FOR PLATFORM WHEELCHAIR LIFTS

BACKGROUND OF THE INVENTION

1. Field of the Invention

This invention relates generally to platform wheelchair lifts and, more particularly, to a method for detecting weight on a platform wheelchair lift prior to stowage.

2. Description of Related Art

Wheelchair lifts typically include mobile platforms to raise and lower passengers between a loading position at a ground level and an entry position at the vehicle's floor level. Further, the wheelchair lifts are usually collapsible for storage, i.e., stowed, within the vehicle. Thus, the wheelchair lifts may include a load platform that is driven through motion patterns to attain loading, entry, and storage positions. In one type of wheelchair lift, the lift is provided with a parallelogram structure to carry a platform that receives the wheelchair. The lift also includes a hydraulic system for actuating the platform through the parallelogram mechanism and a control unit for controlling the different motion patterns to raise and lower the platform and to collapse the unit for storage.

Due to safety considerations, the wheelchair lift unit must be able to detect weight on the platform before collapsing the unit for storage. Previous federal regulations provided that the platform cannot be capable of stowing a weight greater than 50 pounds. Wheelchair lifts typically complied with this regulation by detecting an increase in dynamic pressure during a stow attempt of the wheelchair lift. During a stow attempt, the added weight on the platform is transferred through the linkage of the platform to the parallelogram mechanism causing an increase in the dynamic pressure of the hydraulic circuit, i.e., the pressure of the hydraulic circuit during movement of the lift. The increase in dynamic pressure triggers a pressure switch to prevent the stowage operation of the lift. The pressure switch is set to actuate or trigger at a pressure level that is higher than the dynamic pressure of the hydraulic circuit when no weight is positioned on the platform. Wheelchair lifts could comply with the previous regulation if the lift would be prevented from stowing with a 50 pound weight placed at the centroid of the platform. However, a new regulation was promulgated which provides that the platform cannot be capable of stowing a weight greater than 50 pounds positioned anywhere on the platform. Thus, the wheelchair lift must be capable of detecting a weight positioned at various points on the platform rather than at the centroid.

As the 50 pound weight is moved closer to the platform pivot, detecting the weight on the platform becomes more difficult by measuring an increase in the dynamic pressure during a stow attempt. If the 50 pound weight is placed at the platform pivot or behind the platform pivot, detecting the 50 pounds by measuring an increase in dynamic pressure is substantially ineffective. For instance, if the 50 pound weight is located 24 inches from the pivot point, the resulting moment required to fold the platform is approximately 1200 inch-lbs. However, if the 50 pound weight is moved to a point that is 3 inches from the pivot point, the resulting moment required to fold the platform is approximately 150 inch-lbs. The hydraulic circuit pressure required to fold the platform in the latter situation may be 800 psi, whereas the pressure required to fold the platform in the former situation may be 1100 psi. Detecting weight on the platform becomes more difficult as the pressure required to fold the platform is closer a hydraulic circuit pressure level that exists when there is no weight positioned on the platform during a stow attempt. In other words, if the weight is positioned closer to the pivot point, the difference in the dynamic pressure of the hydraulic circuit with weight and without weight on the platform becomes smaller, which can result in false readings that weight is present on the platform.

SUMMARY OF THE INVENTION

One embodiment of the present invention is directed to a method for detecting weight on a platform lift having a platform, a hydraulic cylinder, and a hydraulic circuit including the steps of measuring a static pressure of the hydraulic circuit, and comparing the measured static pressure to a baseline pressure of the hydraulic circuit. The baseline pressure is a static pressure of the hydraulic circuit without external weight positioned on the platform.

The method may further include the step of positioning the platform at an entry position that is level with a floor of a vehicle. The method may also include the steps of sending a signal to a pump to raise the pressure of the hydraulic circuit prior to measuring the static pressure of the hydraulic circuit, and sending a signal to a valve to reduce the pressure of the hydraulic circuit to a weight detection level. The valve may be a poppet valve. Further, the method may include the steps of moving a switch to an open position when the measured static pressure has a higher value than the baseline pressure, and preventing the platform lift from moving into a stowed position within a vehicle when the switch is in the open position. The switch may be a pressure switch. The method may also include the step of moving the platform wheelchair lift into a stowed position within a vehicle when the switch is in a closed position.

In a further embodiment, a method of detecting weight on a platform wheelchair lift for a vehicle includes the step of providing a platform wheelchair lift comprising a platform having a planar surface, a parallelogram mechanism, platform linkage connecting the platform to the parallelogram mechanism, a hydraulic cylinder connected to the parallelogram mechanism, and a hydraulic circuit, The platform wheelchair lift has an entry position where the platform is level with a floor of the vehicle, and a stowed position where the platform is positioned within the vehicle. The method further includes the steps of measuring a static pressure of the hydraulic circuit when the platform wheelchair lift is in the entry position, and comparing the measured static pressure to a baseline pressure of the hydraulic circuit. The baseline pressure is a static pressure of the hydraulic circuit without external weight positioned on the platform. The method may further include the steps of sending a signal to a pump connected to the hydraulic circuit to raise a pressure of the hydraulic circuit, and sending a signal to a valve to reduce the pressure of the hydraulic circuit to a weight detection level. Reducing the system pressure of the hydraulic circuit to the weight detection level may move the platform wheelchair lift to the entry position. The method may also include the steps of moving a switch to an open position when the measured static pressure has a higher value than the baseline pressure, and preventing the platform lift from moving into the stowed position when the switch is in the open position.

In another embodiment, a method for detecting weight on a platform lift having a platform, a hydraulic cylinder, and a hydraulic circuit includes the steps of connecting a pressure switch to a feed line for the hydraulic cylinder, and setting a triggering pressure for the pressure switch to a value that is at least equal to a static pressure of the hydraulic circuit without external weight positioned on the platform. The pressure switch has a first position and a second position. The method may further include the step of preventing the platform lift from moving into a stowed position when the pressure switch is in the second position.

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific embodiments illustrated in the accompanying drawing figures and described herein are simply exemplary and should not be considered as limiting.

Figure 1:
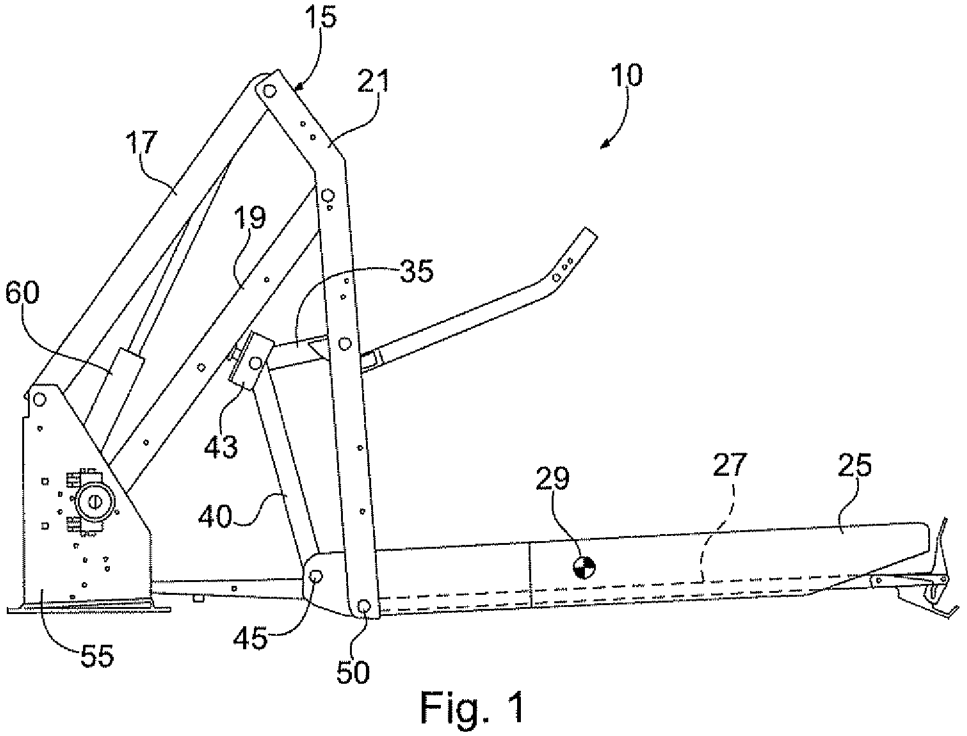
FIG. 1 is a side view of a portion of a platform wheelchair lift in accordance with one embodiment of the present invention.
Figure 2:
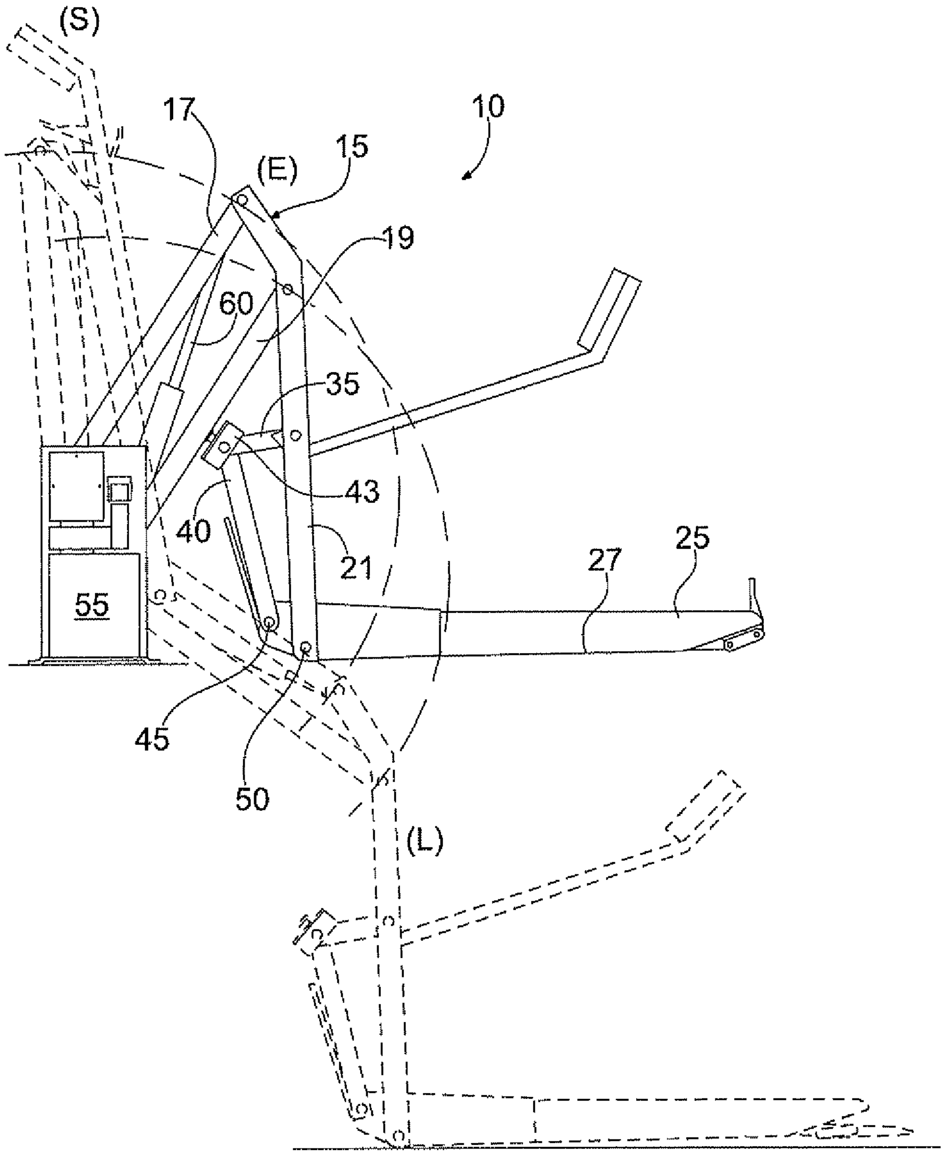
FIG. 2 is a side view of the platform wheelchair lift of FIG. 1, showing a stow, entry, and load position of the wheelchair lift.
Figure 3:
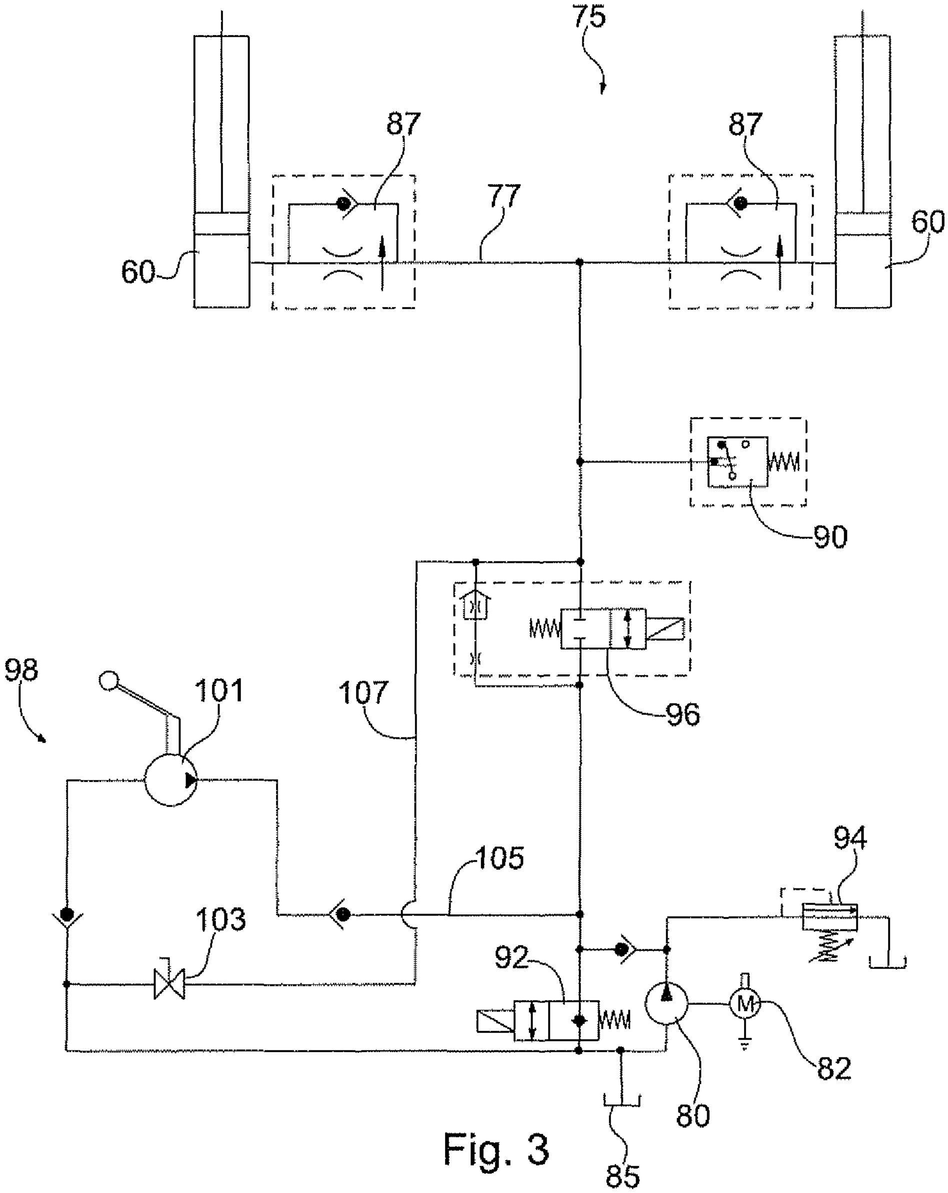
FIG. 3 is a hydraulic circuit diagram of the platform wheelchair lift of FIG. 1.

In one embodiment, shown in FIGS. 1-3, a platform wheelchair lift 10 is provided having a parallelogram mechanism 15, a platform 25, a base plate 55, a pair of hydraulic cylinders 60, and a hydraulic circuit 75. The parallelogram mechanism 15 includes a pair of spaced apart upper arms 17 and a pair of spaced apart lower arms 19 pivotally secured at an outboard end (remote from the base plate 55) to corresponding vertical links 21 and pivotally secured at an inboard end to the base plate 55. The platform 25 has a platform surface 27 having a centroid 29. The inboard end of the platform 25 is secured to the parallelogram mechanism 15 via the vertical links 21 to form a platform pivot 50. Further, a pair of first links 35 is pivotally secured to respective vertical links 21 at one end and is pivotally secured to respective contact pads 43 at the other end. A pair of second links 40 is pivotally secured to a link pin 45 inboard of the pivot 50 of the platform 25 at one end and is pivotally secured to respective contact pads 43 at the other end. The hydraulic cylinders 60 are pivotally secured to the outboard end of the upper arms 17 at one end and are pivotally secured to the base plate 55 at the other end.

Referring to FIG. 2, the platform wheelchair lift 10 moves between a lower loading position (L) outside of a vehicle (not shown) for receiving a wheelchair on the platform 25, a raised entry position (E) level with a floor of the vehicle, and a stowed position (S) inside of the vehicle. To raise the platform from the loading position (L) to the entry position (E), the hydraulic cylinders 60 are actuated causing the parallelogram mechanism 15 to pivot upwardly until the platform 25 lies in a horizontal plane level with the floor of the vehicle. The parallelogram mechanism 15 maintains the platform 25 in a substantially horizontal position as it is raised or lowered between the loading and entry positions. At the entry position (E), the contact pads 43, which are pivotally connected to the first links 35 and the second links 40, abut the lower arm 19 of the parallelogram mechanism 15. With further extension of the hydraulic cylinders 60, the second link 40 is compressed and forced downward. The force from the second link 40 is transferred to the platform 25 via the link pin 45 causing the platform 25 to pivot around the platform pivot 50 and place the platform wheelchair lift 10 into the stowed position (S). Moving the platform wheelchair lift 10 from the stowed position (S) to the loading position (L) may be accomplished by reducing the pressure within the cylinders allowing the platform wheelchair lift 10 to move from the stowed position to the loading position under its own weight.

Referring to FIG. 3, the hydraulic circuit 75 for the platform wheelchair lift 10 includes a feed line 77 extending from the hydraulic cylinders 60 to a gear pump 80 actuated by an electric motor 82. The gear pump 80 is connected to a reservoir 85 for supplying hydraulic fluid to the hydraulic cylinders 60. The hydraulic circuit 75 further includes a pair of flow control valves 87 positioned adjacent to the respective hydraulic cylinders 60. A pressure switch 90 is positioned upstream from the hydraulic cylinders 60 and downstream from the gear pump 80. Further, a poppet valve 92 is positioned on the feed line 77 between the reservoir 85 and the hydraulic cylinders 60 such that actuation of the poppet valve 92 connects the hydraulic cylinders 60 to the reservoir 85 thereby releasing pressure within the hydraulic cylinders 60. A pressure relief valve 94 and a deceleration control valve 96 are positioned downstream of the gear pump 80. A manual backup 98 is also connected to the feed line 77 to enable actuation of the platform wheelchair lift 10 in the event of a power failure or gear motor failure. The manual backup 98 includes a manual backup pump 101 and a manual release valve 103 connected to the feed line 77 via first and second branch lines 105, 107.

In one embodiment, a method for detecting the presence of weight on the wheelchair platform 25 prior to moving the platform wheelchair lift 10 from the entry position (E) to the stowed position (S) includes the steps of measuring a static pressure of the hydraulic circuit 75 and comparing the measured static pressure to a baseline pressure of the hydraulic circuit 75. The baseline pressure is a static pressure of the hydraulic circuit 75 without external weight positioned on the platform 25. If the measured static pressure is higher than the baseline pressure, the platform wheelchair lift is prevented from moving into the stowed position (S). When external weight, i.e., separate from the weight of the platform wheelchair lift 10 itself such as a person using the platform wheelchair lift 10, is positioned on the platform 25, the static pressure of the hydraulic circuit required to maintain the position of the platform 25 is higher than the baseline pressure. Accordingly, the platform wheelchair lift 10 is selectively moved into the stowed position (S) based on the static pressure of the hydraulic circuit 75. Prior to measuring the static pressure of the hydraulic circuit 75, the platform 25 may be positioned at the entry position (E) level with the floor of the vehicle.

The method may also include the steps of sending a signal, such as a pulse signal, to gear pump 80 to raise the pressure of the hydraulic circuit 75 to a predetermined level, and sending a signal, such as a pulse signal, to open the poppet valve 92 to reduce the pressure of the hydraulic circuit 75 to a suitable weight detection level and to return the platform 25 to the entry position (E). The pulse signal is initially sent to the gear pump 80 to raise the pressure of the hydraulic circuit 75 because, over time, the pressure of the hydraulic circuit 75 will decay and will eventually drop to a value where detection of external weight on the platform 25 would be more difficult. The pulse signal is sent to open the poppet valve 92 to lower the platform 25 back to the entry position (E), which would have been slightly raised by the previous increase in the pressure of the hydraulic circuit 75, and to drop the pressure of the hydraulic circuit 75 back to a desired weight detection level.

The static pressure of the hydraulic circuit 75, i.e., the pressure of the hydraulic circuit 75 when the platform wheelchair lift 10 is stationary, is measured and compared to the baseline pressure by the pressure switch 90. The pressure switch 90 is set to move from an open position to a closed position at a triggering pressure. The triggering pressure of the pressure switch 90 may be the baseline pressure of the hydraulic circuit 75 or another suitable valve higher than the baseline pressure. Thus, the pressure switch 90, which is connected to the feed line 77, measures the static pressure and compares the measured static pressure to the triggering pressure. If the static pressure is above the baseline pressure, the pressure switch is moved to the open position and the platform wheelchair lift 10 is prevented from moving to the stowed position (S). Accordingly, the method of detecting weight on the platform 25 may include the step of preventing the platform wheelchair lift 10 from moving to the stowed position (S) when the pressure switch 90 is open. The platform wheelchair lift 10 may also include a number of other circuits that must be active before the platform wheelchair lift 10 is moved into the stowed position (S).

As discussed above, a certain static pressure of the hydraulic circuit 75 is required to hold the platform wheelchair lift 10 at the entry position (E). The static pressure of the hydraulic circuit 75 will be higher, i.e., there will be an increase in pressure, when external weight, such as a 50 pound object, is positioned on the platform surface 27 regardless of where on the platform surface 27 the extra weight is located. Thus, the method for detecting the presence of weight on the wheelchair platform 25 according to the above-described embodiments, does not rely upon the location of the external weight on the platform surface 27 compared to conventional methods requiring the weight to be located at some point in front of or outboard of the platform pivot 50. Although dependent on the size of the platform 25, the static pressure required to hold the platform 25 at the entry position (E) is approximately 200 psi. Positioning external weight on the platform 25 adds weight to the overall weight of the platform 25. If the static pressure of the hydraulic circuit is 200 psi when the platform 25 is at the entry position (E), the static pressure of the hydraulic circuit 75 is approximately 240 psi when a 50 pound weight is positioned on the platform surface 27. The static pressure value with 50 pounds positioned on the platform surface 27 is constant regardless of where the 50 pounds is located relative to the pivot 50. Furthermore, the method according to the embodiments described above does not have to initiate the stowage of the platform 25 before the external weight is detected as opposed to conventional methods utilizing increases in dynamic pressure to detect the weight.

Although the method for detecting weight on a platform lift is described with reference to a parallelogram-type lift, the method may be employed in connection with any suitable type of lifting apparatus. Furthermore, the static pressure of the hydraulic circuit 75 may be measured and compared to the baseline pressure using any suitable arrangement. For instance, instead of employing the pressure switch 90, the hydraulic circuit 75 may include a pressure sensor (not shown) to monitor the pressure of the hydraulic circuit 75. The pressure sensor may be connected to an electronic control unit (not shown) that controls the operation of the platform wheelchair lift 10. Before moving the platform 25 to the stowed position (S), the electronic control unit may compare the measured static pressure value from the pressure sensor to the baseline pressure. The electronic control unit may only allow the platform 25 to move into the stowed position (S) if the measured static pressure is equal to or within a specified range of the baseline pressure.

While certain embodiments of the method for detecting weight on a wheelchair platform were described in the foregoing detailed description, those skilled in the art may make modifications and alterations to these embodiments without departing from the scope and spirit of the invention. Accordingly, the foregoing description is intended to be illustrative rather than restrictive.

The invention claimed is:

1. A method for detecting weight on a platform lift having a platform, a hydraulic cylinder, and a hydraulic circuit, comprising the steps of:

positioning the platform at a raised position;

after the positioning step, sending a signal to a pump to raise a pressure of the hydraulic circuit to a level above a weight detection level;

sending a signal to a valve to reduce the pressure of the hydraulic circuit to the weight detection level;

after the signal sending steps, measuring a static pressure of the hydraulic circuit; and comparing the measured static pressure to a baseline pressure of the hydraulic circuit, wherein the baseline pressure is a static pressure of the hydraulic circuit without external weight positioned on the platform.

2. The method of claim 1, wherein the step of positioning the platform includes positioning the platform at an entry position that is level with a floor of a vehicle.

3. The method of claim 1, wherein the valve comprises a poppet valve.

4. The method of claim 1, further comprising the step of moving a switch to an open position when the measured static pressure has a higher value than the baseline pressure.

5. The method of claim 4, further comprising the step of preventing the platform wheelchair lift from moving into a stowed position within a vehicle when the switch is in the open position.

6. The method of claim 5, wherein the switch comprises a pressure switch.

7. The method of claim 4, further comprising the step of moving the platform wheelchair lift into a stowed position within a vehicle when the switch is in a closed position.

8. A method of detecting weight on a platform wheelchair lift for a vehicle comprising the steps of:

providing a platform wheelchair lift comprising a platform having a planar surface, a parallelogram mechanism, platform linkage connecting the platform to the parallelogram mechanism, a hydraulic cylinder connected to the parallelogram mechanism, and a hydraulic circuit, wherein the platform wheelchair lift has an entry position where the platform is level with a floor of the vehicle, and a stowed position where the platform is positioned within the vehicle;

positioning the platform at the entry position;

after the positioning step, sending a signal to a pump to raise a pressure of the hydraulic circuit to a level above a weight detection level;

sending a signal to a valve to reduce the pressure of the hydraulic circuit to the weight detection level;

after the signal sending steps, measuring a static pressure of the hydraulic circuit; and comparing the measured static pressure to a baseline pressure of the hydraulic circuit, wherein the baseline pressure is a static pressure of the hydraulic circuit without external weight positioned on the platform.

9. The method of claim 8, wherein reducing the system pressure of the hydraulic circuit to the weight detection level moves the platform wheelchair lift to the entry position.

10. The method of claim 8, wherein the valve comprises a poppet valve.

11. The method of claim 8, further comprising the step of moving a switch to an open position when the measured static pressure has a higher value than the baseline pressure.

12. The method of claim 11, further comprising the step of preventing the platform lift from moving into the stowed position when the switch is in the open position.

13. The method of claim 12, wherein the switch comprises a pressure switch connected to the hydraulic circuit.

14. The method of claim 11, further comprising the step of moving the platform wheelchair lift into the stowed position when the switch is in a closed position.

15. A method for detecting weight on a platform lift having a platform, a hydraulic cylinder, and a hydraulic circuit, comprising the steps of:

connecting a pressure switch to a feed line for the hydraulic cylinder, the pressure switch having a first position and a second position;

setting a triggering pressure for the pressure switch to a value that is at least equal to a static pressure of the hydraulic circuit without external weight positioned on the platform;

positioning the platform at a raised position;

after the positioning step, sending a signal to a pump to raise a pressure of the hydraulic circuit to a level above a weight detection level;

sending a signal to a valve to reduce the pressure of the hydraulic circuit to the weight detection level; and after the signal sending steps, measuring a static pressure of the hydraulic circuit, wherein the pressure switch is in the second position when the measured static pressure of the hydraulic circuit is higher than the triggering pressure.

16. The method of claim 15, further comprising the step of preventing the platform lift from moving into a stowed position when the pressure switch is in the second position.

* * * * *